United States Patent
Nylander

[15] 3,642,454
[45] Feb. 15, 1972

[54] PRODUCTION OF POTASSIUM CHLORIDE FROM CARNALLITIC SALTS

[72] Inventor: Alfred F. Nylander, Redwood City, Calif.
[73] Assignee: Kaiser Aluminum & Chemical Corp., Oakland, Calif.
[22] Filed: June 27, 1968
[21] Appl. No.: 740,497

[52] U.S. Cl................................23/297, 23/298, 23/302, 23/89, 23/91, 23/312 AH, 23/304
[51] Int. Cl..........................................C01d 3/08, C01d 3/16
[58] Field of Search...................23/302, 304, 312, 89, 295, 23/296, 299, 298, 303, 91, 312 AH, 297

[56] References Cited

UNITED STATES PATENTS

| | | | |
|---|---|---|---|
| 2,479,001 | 8/1949 | Burke | 23/304 X |
| 2,687,339 | 8/1954 | Dancy | 23/302 X |
| 2,699,379 | 1/1955 | Luque | 23/302 X |
| 3,058,729 | 10/1962 | Dahms | 23/312 X |
| 3,080,220 | 3/1963 | Lagatski | 23/312 |
| 3,101,247 | 8/1963 | Serowy | 23/312 X |
| 3,365,278 | 1/1968 | Kelly | 23/302 X |
| 1,432,796 | 10/1922 | Silsbee | 23/297 |

FOREIGN PATENTS OR APPLICATIONS

| | | | |
|---|---|---|---|
| 1,064,044 | 8/1959 | Germany | 23/302 |

Primary Examiner—Norman Yudkoff
Assistant Examiner—S. J. Emery
Attorney—James E. Toomey, Paul E. Calrow, Harold L. Jenkins and John A. Sarjeant

[57] ABSTRACT

Potassium chloride is produced from carnallitic salts consisting essentially of carnallite KCl·MgCl$_2$·6H$_2$O) and halite (NaCl). The salt is contacted with an aqueous medium to dissolve selectively the magnesium chloride, leaving a solid phase of KCl–NaCl mixture. This mixture is admixed with an amount of aqueous medium at least sufficient to dissolve substantially all of the NaCl and then the admixture is subjected to evaporation. The KCl will crystallize from the system and the crystals are washed to recover fertilizer grade KCl of at least 95 percent purity.

2 Claims, 1 Drawing Figure

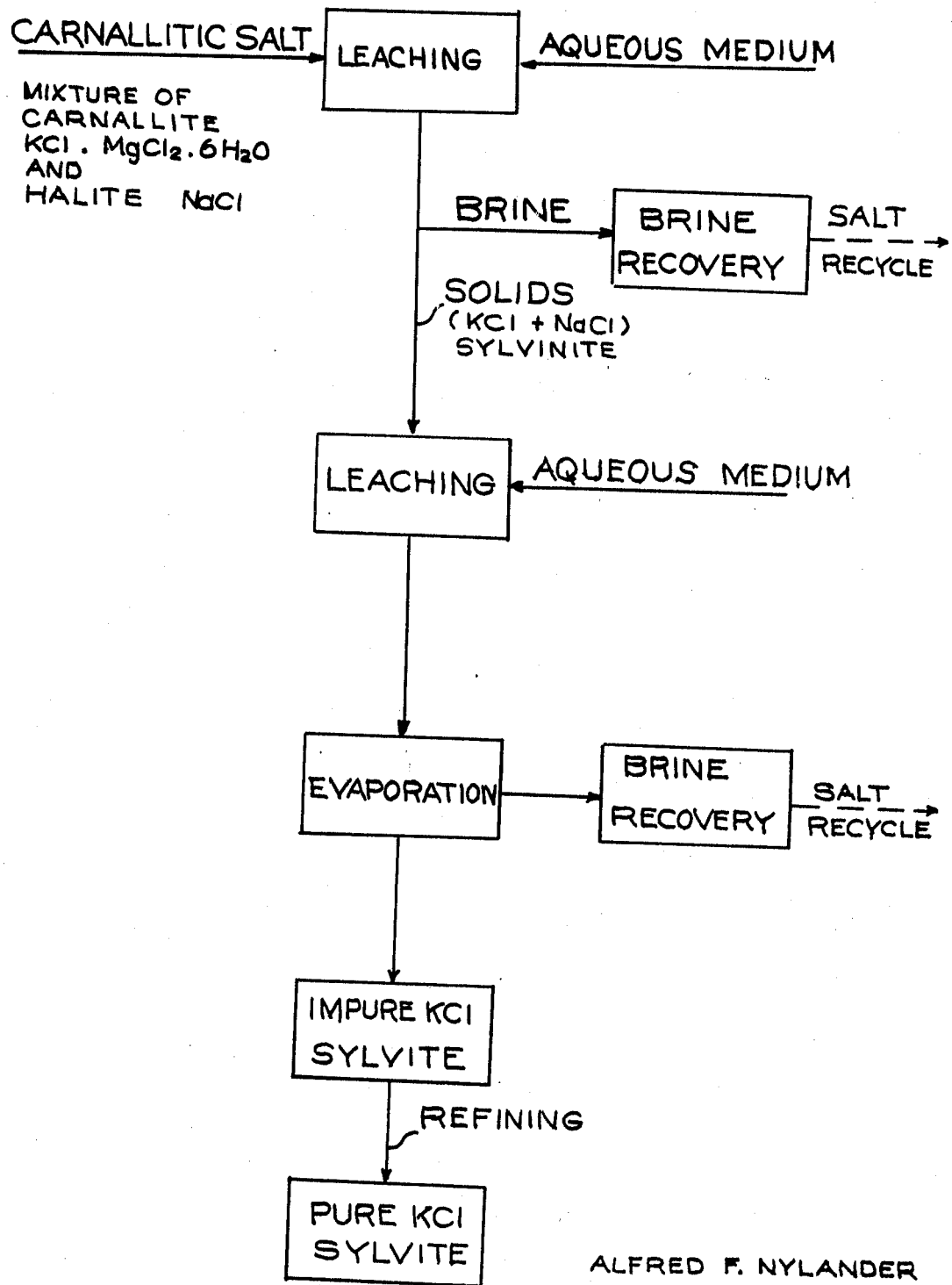

PRODUCTION OF POTASSIUM CHLORIDE FROM CARNALLITIC SALTS

BACKGROUND OF THE INVENTION

This invention is directed to the production of potassium chloride from carnallitic salts containing potassium, sodium and magnesium chlorides.

Potassium chloride is a valuable ingredient of fertilizers. Its recovery from brines originating from sea water, inland deposits and salt mines posed difficult problems, as the potassium chloride is found usually in combination with other salts, such as sodium, magnesium, calcium chlorides and sulfates. The separation of potassium chloride from the other salts in an economic manner and in a purity enabling its use as a fertilizer ingredient required elaborate mechanical manipulations such as several process steps of crystallization, centrifugation, filtration, etc., or involved extended periods of contact with the moisture of the atmosphere combined with solar evaporation, which in itself is a time-consuming operation.

It has now been found that potassium chloride can be produced from salts containing, as major components, potassium chloride, magnesium chloride, and sodium chloride, without any involved mechanical steps and without the time-consuming contact with the moisture of the atmosphere. These and other advantages of the process of the present invention will be evident from the detailed description and the accompanying process diagram.

BRIEF SUMMARY OF THE INVENTION

Potassium chloride is produced from carnallitic salts consisting essentially of carnallite ($KCl \cdot MgCl_2 \cdot 6H_2O$) and halite (NaCl) by contacting the carnallitic salt with an aqueous medium, such as fresh water, sea water or brine unsaturated in magnesium ions to preferentially remove from the salt the magnesium chloride by dissolution. The remaining solid phase consisting essentially of KCl and NaCl is then admixed with an aqueous medium such as fresh water, sea water, or brine unsaturated in magnesium and sodium ions. The quantity of aqueous medium admixed is at least sufficient to dissolve substantially all of the NaCl. The admixture is subsequently subjected to evaporation which will result in the formation of potassium chloride crystals. Solar evaporation is particularly suitable to accomplish this step of the present invention. Impurities are removed by washing the crystals and potassium chloride is recovered in a purity of at least 95 percent.

DETAILED DESCRIPTION OF THE INVENTION

In accordance with this invention, it has been found that potassium chloride can be produced from carnallitic salts consisting of carnallite ($KCl \cdot MgCl_6 \cdot 6H_2O$) and halite (NaCl) and having as major components potassium, sodium, magnesium, chloride and sulfate ions.

The term "major components," as used in the present application, refers to a carnallitic salt, wherein the five components: potassium, magnesium, sodium, chloride and sulfate ions constitute at least 80 percent by weight (excluding water of crystallization and entrained moisture) of the carnallitic salt. Other components such as calcium, carbonate, bromide, and iodide ions, if present, constitute not more than 20 percent by weight of the carnallitic salt.

The carnallitic salts which are useful in the process of the present invention can be derived from brines containing the aforementioned five major components. These brines whether originating from sea water, such as the brines of the Sechura Desert in Peru or the Dead Sea in Israel, or from inland deposits, such as the brine of the Great Salt Lake of Utah, are suitable for the recovery of carnallitic salts employed in the present process. A typical carnallitic salt may be produced in accordance with the process which is described and claimed in my pending U.S. application Ser. No. 435,489, filed on Feb. 26, 1965, now abandoned. An increase in the amount of magnesium chloride in the brine during solar evaporation depresses the solubility of sodium chloride more than the solubility of potassium chloride and results in a carnallitic salt having an improved KCl-to-NaCl ratio. Any industrial bittern or salt from salt mines which consists mainly of carnallitic salts will be a suitable source for the production of potassium chloride according to the process of the present invention.

For best results, caranallitic salts, wherein the KCl-to-NaCl weight ratio ranges between about 1:1.5–2.2 are utilized. For optimum KCl recovery, the NaCl content of the carnallitic salt should not exceed 2.2 parts per part of KCl. It will be evident to men skilled in the art that if the KCl-to-NaCl ratio in the carnallitic salt is outside of the optimum ratio of 1:1.5–2.2 KCl to NaCl, adjustments can readily be made to establish the optimum KCl-to-NaCl ratio within the carnallitic salt.

According to the process of the present invention, the carnallitic salt is contacted with an aqueous medium to remove or dissolve preferentially the magnesium component from the carnallitic salt. The aqueous medium employed for this purpose can be fresh water, sea water or a brine unsaturated in magnesium ions. When brine is utilized for the decomposition or leaching of the carnallitic salt, for best results the sodium ion concentration of the brine should also be maintained at a relatively low level. This will assure that the optimum ratio of KCl:NaCl will not be materially changed during the decomposition step.

The quantity of aqueous medium which is employed to leach or decompose the carnallitic salt has to be sufficient to dissolve nearly all of the magnesium chloride, leaving a solid salt mixture consisting essentially of potassium and sodium chlorides. The nature of the aqueous medium determines the quantity to be utilized in this step. Fresh water is preferred because of the relative absence of dissolved salts therein, thus allowing reduction of the volume to be added. Nevertheless, sea water or brine which are unsaturated in magnesium ions will also accomplish the decomposition of the carnallitic salt. The amount of aqueous medium will usually be from about one to about two and a half times by weight of the amount of carnallitic salt. Also, low sodium chloride content in the aqueous medium is preferred in order to facilitate the codissolution of sodium chloride. Dissolution or leaching of the carnallitic salt provides an aqueous phase, consisting essentially of dissolved magnesium chloride and small amounts of codissolved sodium chloride and potassium chloride and sulfates of these cations; it also leaves a solid phase, which consists essentially of a mixture of potassium chloride and sodium chloride (commonly called sylvinite). Small amounts of undissolved magnesium chloride and entrained water are also present in the solid phase.

Separation of the aqueous phase from the solid phase can be accomplished by any known method. If a pond system is employed, the aqueous phase is drawn off and transferred to a collection point, where it can be further utilized.

The solid phase of KCl-NaCl mixture thus produced has a favorable NaCl/KCl weight ratio as a result of the preferential dissolution of the magnesium chloride and codissolution of some of the sodium chloride. At this stage of the process the NaCl/KCl ratio should not exceed about 2 and preferably will be less than 1.

The solid KCl-NaCl mixture from which the aqueous phase containing the bulk of the $MgCl_2$ is removed is then admixed with a sufficient quantity of aqueous medium, such as fresh water, sea water or brine unsaturated in magnesium and sodium ions to produce an admixture in which substantially all of the sodium chloride is in solution. For the reasons previously mentioned, fresh water produces the best results. Sea water or brine unsaturated in magnesium chloride and preferably in sodium chloride are equally suitable in this process step. While the volume of aqueous medium employed in the admixing step should be sufficient to dissolve at least all of the sodium chloride, dissolution of all of the salts in the solid phase is also contemplated by the process of the present invention. The volume of the aqueous medium to be added is, however, for practical reasons, controlled by the next process step, which comprises evaporation of the water present in the admixture. Therefore, to provide maximum economy, it is preferred to add the minimum amount of aqueous medium which will still effect dissolution of most of the solid phase, particularly substantially all of the NaCl present.

As referred to in the preceding paragraph, evaporation of the water from the aqueous admixture is the next process step. The evaporation, which will produce crystalline potassium chloride from the mixture of sodium and potassium chlorides, can be accomplished by any known evaporation methods. The process of the present invention is, however, particularly adapted to solar evaporation, as solar evaporation requires no additional input of heat energy and provides the most economical production of potassium chloride as far as the energy balance of the process is concerned. It is to be understood that evaporation of the admixture by artificial means, such as heating, is equally within the scope of the present invention.

The evaporation step of the present process, particularly solar evaporation, will produce a crystalline product of high KCl content and of shipping grade size quality. Under the term of "shipping grade size quality" a crystalline product is meant which without any mechanical compacting will provide a particle size which will be substantially all retained on a 100-mesh screen (U.S. Standard Sieve), and at least 90 percent of the particles being retained on a 65-mesh screen.

The KCl content of the crystals ranges between 66 and 76 percent and can be readily refined to produce a substantially pure potassium chloride of at least 95 percent purity. Refining may be accomplished simply by washing the KCl crystals with water to remove the impurities, such as NaCl adhered to the surface. This can be accomplished without significant loss of KCl. The so-produced KCl is at least 95 percent pure and is suitable to be employed without any further treatment as fertilizer grade sylvite.

The brine or mother liquid resulting from the crystallization of KCl (sylvite), can be drawn off the crystals in a known manner and further utilized. It consists essentially of sodium chloride and potassium and small amounts of magnesium chloride. For economical purposes, it can be recycled either into the carnallitic salt-aqueous medium mixing step or, if desired, employed as a makeup constituent in the preparation of the carnallitic salt.

The accompanying process diagram shows schematically the production of potassium chloride according to the process of the present invention.

The major process steps are depicted by heavy lines and the auxiliary steps, such as utilization of the produced brines, are shown as dotted lines.

The following examples and table will further demonstrate the efficiency of the process of the present invention:

EXAMPLE I 224.7 lb. of carnallitic salt consisting essentially of K—8.78%, Mg—7.79%, Na—3.33%, Cl$^-$—35.06%, SO$_4$—1.14%, balance water (all percentages are weight percent), was contacted in a solar pan with 90.86 lb. of fresh water. The produced aqueous phase was drawn off and to the remaining solid phase, weighing 94.9 lb. and consisting essentially of K—16.8%, Mg—5.56%, Na—2.2%, Cl$^-$—34.68%, SO$_4$—0.39%, balance water (all percentages are weight percent) 177.3 lb. of fresh water was admixed. The aqueous admixture was subjected to solar evaporation for a period of about 5 weeks, during which period 140.7 lb. of water evaporated. The brine was drawn off and the crystalline phase weighing 34.98 lb. was analyzed. The analysis showed that the crystalline phase contained 72.2 percent by weight of KCl. The impure KCl crystals were washed with 3.3 lb. of fresh water and dried. The washed crystals analyzed as 98.5 percent pure KCl.

The brines drawn off in the sylvinite and sylvite steps were recycled after evaporation to the carnallitic salt producing step.

EXAMPLE II 324.7 lb. of carnallitic salt consisting essentially of K—8.8%, Mg—7.2%, Na—6.7%, Cl$^-$—37.7%, SO$_4$—2.17%, balance water (all percentages are weight percent), was admixed with 384.4 lb. sea water containing approximately 13 lb. of dissolved salts, such as KCl, NaCl, MgCl$_2$ and the corresponding sulfates. The aqueous phase was drawn off and the remaining solid phase weighing approximately 57 lb. was analyzed. It consisted essentially of K—27.1%, Mg—1.6%, Na—6.7%, Cl$^-$—39.2%, SO$_4$—0.49% (all percentages are weight percent). To this solid phase 23.5 lb. of sea water was added and the aqueous medium was thoroughly admixed with the solid phase. After a settling period, the brine was drawn off and the remaining solid phase weighing approximately 24.2 lb. was dried and analyzed. The solid product consisted essentially of KCl of 98.5 percent purity.

TABLE I

A typical size distribution and analysis of KCl produced in accordance with this invention is as follows:

| Sieve size in mesh (U.S. Standard Sieve) | Weight % retained on sieve (cumulative) | KCl % |
|---|---|---|
| 14 | 9.9 | 98.5 |
| 20 | 31.0 | 98.7 |
| 28 | 57.1 | 98.7 |
| 35 | 80.0 | 98.8 |
| 48 | 93.0 | 98.5 |
| 65 | 97.6 | 98.7 |
| 100 | 99.7 | |
| −100 | 0.3 | |

It will appreciated, that the embodiments hereinbefore described are only examples and that variations may be introduced which are well within the purview of the present invention without departing from the spirit and the scope of the inventive concepts which are particularly pointed out and claimed herebelow.

What is claimed is:

1. A process for producing potassium chloride from carnallitic salts consisting essentially of carnallite (KCl·MgCl$_2$·6H$_2$O) and halite (NaCl) and derived from solar evaporation of brines containing as major components sodium, potassium, magnesium, chloride and sulfate ions, wherein the KCl-to-NaCl ratio of the carnallitic salt is from about 1 part by weight of KCl to about 1.5 to 2 parts by weight of sodium chloride, which comprises:

a. contacting the carnallitic salt with fresh water to decompose said salt into a first liquid phase containing dissolved therein substantially all of the magnesium ions and into a first solid phase consisting essentially of potassium and sodium chlorides;
   b. separating the first solid phase from the first liquid phase;
   c. subjecting said separated first liquid phase to evaporation to produce a carnallitic salt;
   d. admixing said first solid phase with fresh water to dissolve said first solid phase and to form an aqueous solution;
   e. subjecting the aqueous solution to evaporation to precipitate a second solid phase of potassium chloride and to produce a second liquid phase containing substantially all the sodium chloride dissolved therein;
   f. separating said precipitated potassium chloride from said second liquid phase;
   g. subjecting said second liquid phase to evaporation to produce a brine and to precipitate a solid mixture of potassium and sodium chloride;
   h. separating said brine from said solid mixture; and
   i. subjecting said brine to evaporation to produce a carnallitic salt consisting essentially of carnallite (KCl·MgCl$_2$·6H$_2$O) and halite (NaCl).

2. Process according to claim 1, wherein said crystalline potassium chloride is washed with water to produce potassium chloride of a purity in excess of 95 percent.